(12) United States Patent
Tayebi et al.

(10) Patent No.: US 11,224,217 B2
(45) Date of Patent: Jan. 18, 2022

(54) STORAGE MEDIA AND POWDER FORMULATIONS FOR AVULSED TEETH AND EXPLANTED TISSUES COMPRISING FIBROBLASTS

(71) Applicant: Marquette University, Milwaukee, WI (US)

(72) Inventors: Lobat Tayebi, Milwaukee, WI (US); Morteza Rasoulianboroujeni, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 243 days.

(21) Appl. No.: 16/393,198

(22) Filed: Apr. 24, 2019

(65) Prior Publication Data

US 2019/0246628 A1    Aug. 15, 2019

Related U.S. Application Data

(63) Continuation-in-part of application No. PCT/US2017/058205, filed on Oct. 25, 2017.

(60) Provisional application No. 62/412,442, filed on Oct. 25, 2016.

(51) Int. Cl.
A01N 1/02 (2006.01)

(52) U.S. Cl.
CPC ........... *A01N 1/021* (2013.01); *A01N 1/0226* (2013.01)

(58) Field of Classification Search
None
See application file for complete search history.

(56) References Cited

U.S. PATENT DOCUMENTS

| | | | |
|---|---|---|---|
| 8,735,054 B1 | 5/2014 | Sun et al. | |
| 8,774,488 B2 | 7/2014 | Parikh et al. | |
| 2003/0198602 A1 | 10/2003 | Chen et al. | |
| 2005/0277107 A1* | 12/2005 | Toner | A01N 1/02 435/2 |
| 2011/0036746 A1 | 2/2011 | Bear | |
| 2011/0143331 A1* | 6/2011 | Roy | A01N 1/02 435/1.1 |
| 2016/0249603 A1* | 9/2016 | Suryan | A01N 1/021 435/1.1 |
| 2017/0157291 A1* | 6/2017 | Crawford | C12N 5/0646 |

FOREIGN PATENT DOCUMENTS

| | | | |
|---|---|---|---|
| CN | 103843758 A | | 6/2014 |
| CN | 105266916 | * | 1/2016 |
| CN | 105266916 A | | 1/2016 |
| CN | 106417254 A | | 2/2017 |
| KR | 20150069469 A | | 6/2015 |
| WO | 2015077199 A1 | | 5/2015 |
| WO | 2017123465 A1 | | 7/2017 |

OTHER PUBLICATIONS

Oyama, H. et al. Basic Study on Preservation Method for Tooth Transplantation Showa Shigakkai Zasshi 24(2)127-138, 2004. (Year: 2004).*
Sun, M. et al. A Novel Approach for the Cryodessicated Preservation of Tissue Engineered Skin Substitutes with Trehalose. Materials Science and Engineering: C 60:60-66, Mar. 1, 2016. (Year: 2016).*
Adeli et al., Comparative In Vitro Study of the Effectiveness of Green Tea Extract and Common Storage Media on Periodontal Ligament Fibroblast Viability, Eur J Dent, 2016, 10(3):408-412.
Alves et al., Stabilization of Polymer Lipid Complexes Prepared with Lipids of Lactic Acid Bacteria Upon Preservation and Internalization into Eukaryotic Cells, Colloids and Surfaces B: Biointerfaces, 2014, 123:446-451.
Andersson et al., International Association of Dental Traumatology Guidelines for the Management of Traumatic Dental Injuries: 2. Avulsion of Permanent Teeth, Dental Traumatology, 2012, 28(2):88-96.
Andreasen, Effect of Extra-Alveolar Period and Storage Media Upon Periodontal and Pulpal Healing After Replantation of Mature Permanent Incisors in Monkeys, International Journal of Oral Surgery, 1981, 10(1):43-53.
Arav, 24. Freeze Drying Red Blood Cells: Development of Novel Technologies, Cryobiology, 2013, 66(3):349.
Ashkenazi et al., In Vitro Viability, Mitogenicity and Clonogenic Capacity of Periodontal Ligament Cells after Storage in Four Media at Room Temperature, Endodontics & Dental Traumatology, 2000, 16(2):63-70.
Blomlöf et al., Effect of Storage in Media with Different Ion Strengths and Osmolalities on Human Periodontal Ligament Cells, Scandinavian Journal of Dental Research, 1981, 89(2):180-187.
Blomlof, Milk and Saliva as Possible Storage Media for Traumatically Exarticulated Teeth Prior to Replantation, Swedish Dental Journal, Supplement 8, 1981, pp. 1-26.
Caglar et al., Viability of Fibroblasts in a Novel Probiotic Storage Media, Dental Traumatology, 2010, 26(5):383-387.
Casaroto et al., Study of the Effectiveness of Propolis Extract as a Storage Medium for Avulsed Teeth, Dental Traumatology, 2010, 26(4):323-331.
Cesari et al., Identification of the Trehalose-6-Phosphate Synthase (tps) Gene in Desiccation Tolerant and Intolerant Tardigrades, Italian Journal of Zoology, 2012, 79(4):530-540.

(Continued)

*Primary Examiner* — Ralph J Gitomer
(74) *Attorney, Agent, or Firm* — Quarles & Brady LLP (57) ABSTRACT

Disclosed herein are methods and compositions for preserving avulsed teeth and/or explanted tissue. The disclosed methods for preserving avulsed teeth and/or explanted tissue typically include placing the avulsed teeth and/or explanted tissue in a preservation solution comprising at least about 2.75 g/L sugar. Suitable explanted tissues for the disclosed methods may include explanted tissues comprising fibroblasts, such as dental tissue and/or oral tissue. The preservation solution of the disclosed preservation methods may include additional components which may include but are not limited to inorganic salts, amino acids, vitamins, and buffering agents. The preservation solution may be prepared from a powder formulation having a long shelf-life.

15 Claims, 4 Drawing Sheets

(56) References Cited

OTHER PUBLICATIONS

Courts et al., Milk as an Interim Storage Medium for Avulsed Teeth, Pediatric Dentistry, 1983, 5(3):183-186.
Crowe et al., Anhydrobiosis, Annual Review of Physiology, 1992, 54:579-599.
Crowe et al., Is Trehalose Special for Preserving Dry Biomaterials?, Biophysical Journal, 1996, 71(4):2087-2093.
Hiltz et al., Vitality of Human Lip Fibroblasts in Milk, Hanks Balanced Salt Solution and Viaspan Storage Media, Endodontics & Dental Traumatology, 1991, 7(2):69-72.
Hwang et al., The Use of Green Tea Extract as a Storage Medium for the Avulsed Tooth, Journal of Endodontics, 2011, 37(7):962-967.
Kang et al., Pigmentation of Skin Graft is Improved by Cryopreservation of Human Skin with Trehalose, Journal of Oral and Maxillofacial Surgery, 2012, 70(6):1464-1472.
Khademi et al., A New Storage Medium for an Avulsed Tooth, The Journal of Contemporary Dental Practice, 2008, 9(6):25-32.
Krasner et al., Apparatus for Storing and Transporting Traumatically Avulsed Teeth, Compend Contin Educ Dent, 1989, 10(4):232-238.
Krasner et al., Preserving Avulsed Teeth for Replantation, Journal of the American Dental Association, 1992, 123(11):80-88.
Lekic et al., The Influence of Storage Conditions on the Clonogenic Capacity of Periodontal Ligament Cells: Implications for Tooth Replantation, International Endodontic Journal, 1998, 31(2):137-140.
Mahal et al., Effect of Three Different Storage Media on Survival of Periodontal Ligament Cells Using Collagenase—Dispase Assay, International Endodontic Journal, 2013, 46(4):365-370.
Marino et al., Determination of Periodontal Ligament Cell Viability in Long Shelf-Life Milk, Journal of Endodontics, 2000, 26(12):699-702.
Mousavi et al., Standard Oral Rehydration Solution as a New Storage Medium for Avulsed Teeth, International Dental Journal, 2010, 60(6):379-382.
Moazami et al., Comparison of Soymilk, Powdered Milk, Hank's Balanced Salt Solution and Tap Water on Periodontal Ligament Cell Survival, Dental Traumatology, 2012, 28(2):132-135.
Moiset et al., Disaccharides Impact the Lateral Organization of Lipid Membranes, Journal of the American Chemical Society, 2014, 136(46):16167-16175.
Morano, Anhydrobiosis: Drying Out With Sugar, Current Biology, 2014, 24(23):R1121-R1123.
Olson et al., Comparison of Various Transport Media on Human Periodontal Ligament Cell Viability, Journal of Endodontics, 1997, 23(11):676-679.
Pileggi et al., Assessment of Post-Traumatic PDL Cells Viability by a Novel Collagenase Assay, Dental Traumatology, 2002, 18(4):186-189.
Pohl et al., Investigations on a Cell Culture Medium for Storage and Transportation of Avulsed Teeth, Australian Endodontic Journal, 1999, 25(2):70-75.
Pohl et al., Results After Replantation of Avulsed Permanent Teeth. I. Endodontic Considerations, Dental Traumatology, 2005, 21(2):80-92.
Pohl et al., Results After Replantation of Avulsed Permanent Teeth. II. Periodontal Healing and the Role of Physiologic Storage and Antiresorptive-Regenerative Therapy, Dental Traumatology, 2005, 21(2):93-101.
Pohl et al., Results After Replantation of Avulsed Permanent Teeth. III. Tooth Loss and Survival Analysis, Dental Traumatology, 2005, 21(2):102-110.
Poi et al., Storage Media for Avulsed Teeth: A Literature Review, Brazilian Dental Journal, 2013, 24(5):437-445.
Sigalas et al., Survival of Human Periodontal Ligament Cells in Media Proposed for Transport of Avulsed Teeth, Dental Traumatology, 2004, 20(1):21-28.
Silva et al., Use of Soymilk as a Storage Medium for Avulsed Teeth, Acta Odontologica Scandinavica, 2013, 71(5):1101-1104.
Souza et al., Viability of Human Periodontal Ligament Fibroblasts in Milk, Hank's Balanced Salt Solution and Coconut Water as Storage Media, International Endodontic Journal, 2011, 44(2):111-115.
Souza et al., Effect of Temperature and Storage Media on Human Periodontal Ligament Fibroblast Viability, Dental Traumatology, 2010, 26(3):271-275.
Souza et al., Effect of HBSS Storage Time on Human Periodontal Ligament Fibroblast Viability, Dental Traumatology, 2010, 26(6):481-483.
Trope et al., Periodontal Healing of Replanted Dog Teeth Stored in Viaspan, Milk and Hank's Balanced Salt Solution, Endodontics & Dental Traumatology, 1992, 8(5):183-188.
Trope, Clinical Management of the Avulsed Tooth: Present Strategies and Future Directions, Dental Traumatology, 2002, 18(1):1-11.
Waymouth, Osmolality of Mammalian Blood and of Media for Culture of Mammalian Cells, In Vitro, 1970, 6(2):109-127.
Welnicz et al., Anhydrobiosis in Tardigrades—The Last Decade, Journal of Insect Physiology, 2011, 57(5):577-583.
Werder et al., Treatment Outcome of 42 Replanted Permanent Incisors with a Median Follow-Up of 2.8 Years, Schweiz Monatsschr Zahnmed, 2011, 121(4):312-320.
American Association of Endodontists, The Recommended Guidelines of the American Association of Endodontists for The Treatment of Traumatic Dental Injuries, 2013, 16 pages.
American Academy of Pediatric Dentistry, Guideline on Management of Acute Dental Trauma, 2007, Reference Manual, vol. 31, No. 6, pp. 187-195.
Russian Article dated 2012 Cited in PCT/US2017/058205 International Search Report dated Feb. 28, 2018, https://www.iadt-dentaltrauma.org/IADT%20guidelines%20-%20part%202%20%20russian%20doc.pdf, 13 pages.
Russian Article dated 2009 Cited in PCT/US2017/058205 International Search Report dated Feb. 28, 2018, https://www.rlsnet.ru/mnn_index_id_98.htm, 4 pages.
Russian Article dated 2016 Cited in PCT/US2017/058205 International Search Report dated Feb. 28, 2018, http://pro-tabletki.ru/inekcionnye-preparaty/rastvor-omnipak-instrukciya-po-primeneniyu-350-mgml.html, 11 pages.
Russian Article dated 2016 Cited in PCT/US2017/058205 International Search Report dated Feb. 28, 2018, https://compendium.com.ua/info/168197/tsefodoks/, 7 pages.
Bissoyi et al., Recent Advances and Future Direction in Lyophilisation and Desiccation of Mesenchymal Stem Cells, Stem Cells International, 2016, vol. 2016, Article ID 3604203, 9 pages.
Moura et al., Soy Milk as a Storage Medium to Preserve Human Fibroblast Cell Viability: An In Vitro Study, Brazilian Dental Journal, 2012, 23(5):559-563.
PCT International Search Report and Written Opinion, PCT/US2017/058205, dated Feb. 28, 2018, 9 pages.
European Patent Office, Partial Supplementary Search Report, Application No. 17863887.0, dated Apr. 6, 2020, 18 pages.

\* cited by examiner

STORAGE MEDIA AND POWDER FORMULATIONS FOR AVULSED TEETH AND EXPLANTED TISSUES COMPRISING FIBROBLASTS

CROSS-REFERENCE TO RELATED PATENT APPLICATIONS

This application is a continuation-in-part application of International Application No. PCT/US2017/058205, filed on Oct. 25, 2017, which international application claims the benefit of priority under 35 U.S.C. § 119(e) to U.S. Provisional Application No. 62/412,442, filed Oct. 25, 2016, the contents of which applications are incorporated herein by reference in their entireties.

BACKGROUND

The field of the invention relates to methods and compositions for preserving avulsed teeth and explanted tissue. In particular, the field of the invention relates to the use of sugar-based compositions for preserving avulsed teeth and/or explanted tissue comprising fibroblasts, such as dental tissue and oral tissue.

SUMMARY

Disclosed herein are methods and compositions for preserving avulsed teeth and/or explanted tissue. The disclosed methods for preserving avulsed teeth and/or explanted tissue typically include placing the avulsed teeth and/or explanted tissue in a preservation solution comprising at least about 2.75 g/L sugar. Suitable explanted tissues for the disclosed methods may include explanted tissues comprising fibroblasts, such as dental tissue and/or oral tissue. The preservation solution of the disclosed preservation methods may include additional components which may include but are not limited to inorganic salts, amino acids, vitamins, buffering agents, and antimicrobial agents. Preferably, the preservation solution comprises at least about 10 g/L sugar and additional components. The preservation solution may be prepared from a powder formulation having a long shelf-life.

DETAILED DESCRIPTION

The disclosed subject matter further may be described utilizing terms as defined below.

Unless otherwise specified or indicated by context, the terms "a", "an", and "the" mean "one or more." For example, "a sugar" should be interpreted to mean "one or more sugars."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

The methods and/or compositions disclosed herein may be practiced and/or utilized for preserving avulsed teeth and/or explanted tissue that comprises fibroblasts. As used herein "preserving" may be defined as maintaining viability of fibroblasts of the explanted tissue. For example, percentage viability of the fibroblasts of the explanted tissue may be measured at the time that the tissue becomes explanted prior to the explanted tissue being placed in a preservation solution, which may be referred to as the beginning of a storage period. Subsequently, after the explanted tissue is placed in a preservation solution as disclosed herein and stored for the storage period, the percent percentage viability of the fibroblasts of the explanted tissue may again be measured at the end of the storage period. Preferably, the percentage viability of the fibroblasts of the explanted tissue at the end of the storage period is high relative to the percentage viability of the fibroblasts at the beginning of the storage period. In some embodiments, the percentage viability at the end of the storage period is at least about 30%, 40%, 50%, 60%, 70%, 80%, 90%, 95%, or higher relative to the percentage viability at the beginning of the storage period (or a within a range defined by any two of these values such as 60%-80%). At the end of the storage period, the explanted tissue may be replanted into its original location and/or transplanted. In instances where viability of the fibroblasts of the explanted tissue is highly maintained after the storage period, successful replantation and/or transplantation and/or survival of the transplanted tissue are maximized.

Typically, the explanted tissue comprises fibroblasts. Suitable explanted tissues for the disclosed methods may include dental tissues and oral tissues, which may comprise periodontal ligament fibroblasts (PDLF), and the disclosed methods and compositions may be practiced and/or utilized for preserving the dental tissues and oral tissues prior to transplantation. Explanted tissues comprising fibroblasts include avulsed teeth. In some embodiments, the explanted tissue is an avulsed tooth and the disclosed method and the disclosed methods and compositions may be practiced and/or utilized for preserving PDLF of the avulsed tooth during a storage period prior to the avulsed tooth being replanted to each original location. However, it should be recognized that the disclosed methods and compositions may be practiced and/or utilized for preserving any tissue comprising fibroblasts.

The compositions disclosed and utilized herein include "sugar-based" solutions. As used herein, a sugar-based solution typically includes at least about 2.75 g/L sugar, and more preferably at least about 5 g/L, 10 g/L, 15 g/L, 20 g/L, 25 g/L, 30 g/L, 35 g/L, 40 g/L, 45 g/L, 50 g/L, 55 g/L, 60 g/L, 65 g/L, 70 g/L, 75 g/L, 80 g/L, 85 g/L, 90 g/L, 95 g/L, 100 g/L, 105 g/L, 110 g/L, 115 g/L, 120 g/L, 125 g/L, 130 g/L, 135 g/L, 140 g/L, 145 g/L, 150 g/L sugar or higher, or a concentration of sugar within a range bounded by any two of these values (e.g., a concentration of 20-40 g/L sugar).

The term "sugar" as used herein encompasses monosaccharides and disaccharides. Suitable sugars for the preservation solutions disclosed herein may include, but are not limited to trehalose, glucose, sucrose, maltose, lactose, fructose, or mixtures thereof. In some embodiments, the sugar comprises, consists essentially of, or consists of trehalose, glucose, or a mixture thereof. In some embodiments, the disclosed preservation solutions may be referred to as "sugar-based" preservation solutions The disclosed preservation solutions for the disclosed preservation methods may include additional components. Additional components may include, but are not limited to inorganic salts, amino acids or salts thereof, vitamins or salts thereof, and buffering agents.

In some embodiments, the preservation solutions may include additional components that include inorganic salts. Suitable inorganic salts for the sugar-based solutions may include, but are not limited to calcium salts (e.g., calcium chloride), disodium salts (e.g., disodium hydrogen phosphate), iron salts (e.g., iron (III) nitrate nonahydrate), magnesium salts (e.g., magnesium sulfate), potassium salts (e.g., potassium chloride and potassium phosphate monobasic), sodium salts (e.g., sodium chloride, sodium dihydrogen phosphate monohydrate, and sodium bicarbonate), and mixtures thereof.

In some embodiments, the preservation solutions may include additional components that include amino acids or salts thereof. Suitable amino acids for the sugar-based solutions may include, but are not limited to the following amino acids or salts thereof: L-Arginine (e.g., L-Arginine monohydrochloride), L-Cystine (e.g., L-Cystine dihydrochloride), L-Glutamine, Glycine, L-Histidine (e.g., L-Histidine monohydrochloride monohydrate), L-Isoleucine, L-Leucine, L-Lysine (e.g., L-Lysine monohydrochloride), L-Methionine, L-Phenylalanine, L-Serine, L-Threonine, L-Tryptophan, L-Tyrosine (e.g., L-Tyrosine disodium salt dihydrate), L-Valine, and mixtures thereof.

In some embodiments, the preservation solutions may include additional components that include vitamins or salts thereof. Suitable vitamins for the sugar-based solutions may include, but are not limited to the following vitamins and salts thereof: pantothenic acid (e.g., D-calcium pantothenate), choline (e.g., choline chloride), folic acid, myo-inositol, niacinamide, pyridoxal (e.g., pyridoxal hydrochloride), pyridoxine (e.g., pyridoxine hydrochloride), riboflavin, thiamine (e.g., thiamine HCl), and mixtures thereof.

In some embodiments, the preservation solutions may include buffering agents. Suitable buffering agents for the sugar-based solutions may include, but are not limited to HEPES (i.e., (4-(2-hydroxyethyl)-1-piperazineethanesulfonic acid). Suitable concentrations for HEPES may include about 0.5 g/L, 1.0 g/L, 1.5 g/L, 2.0 g/L, 2.5 g/L, 3.0 g/L, 3.5 g/L, 4.0 g/L, 4.5 g/L, 5.0 g/L, 5.5 g/L, 6.0 g/L, 6.5 g/L, 7.0 g/L, 7.5 g/L, 8.0 g/L, 8.5 g/L, 9.0 g/L, 9.5 g/L, 10.0 g/L, 10.5 g/L, 11.0 g/L, 11.5 g/L, 12.0 g/L, 12.5 g/L, 13.0 g/L, 13.5 g/L, 14.0 g/L, 14.5 g/L, 15.0 g/L, or a concentration range bounded by any two of these values (e.g., 1.0-2.0 g/L or about 1.5 g/L).

In some embodiments, the preservation solutions may include anti-microbial agents, which may include, but are not limited to anti-biotic agents and/or anti-fungal agents. Anti-biotic agents may include, but are not limited to penicillins, tetracyclines, cephalosporins, quinolones, lincomycins, macrolides, sulfonamides, glycopeptides, aminoglycosides, carbapenems, and streptomycins. Anti-fungal agents may include, but are not limited to clotrimazole, econazole, miconazole, terbinafine, fluconazole, ketoconazole, and amphotericin.

Preferably, the disclosed preservations solutions are substantially sterile and/or sterilized prior to use. The disclosed preservations solutions and/or components or formulations for preparing the disclosed preservation solutions may be sterilized using methods that may include, but are not limited to radiation and filtering. Preferably, filtration is used as a sterilization method. The preservation solution or components of the preservation solution may be sterilization via filtration by passing the preservation solution or the components of the preservation solution through a filter in order to eliminate micro-organisms (e.g., a 200 nm or 100 nm filter).

In some embodiments, the sugar-based solutions may have a physiological pH, which may be defined herein as a pH of 6.8-7.6, more preferably 7.0-7.5, even more preferably 7.2-7.4. In some embodiments, the sugar-based solutions may have a physiological pH at ambient $CO_2$ concentrations (e.g., $CO_2$ at 0.04%).

In the disclosed methods for preserving avulsed teeth and/or explanted tissue, the teeth or tissue may be stored in a preservation solution at any suitable storage temperatures. In some embodiments, the storage temperature is −70° C., −20° C., 0° C., 4° C., 20° C., 25° C., or 37° C., or a storage temperature range defined by any two of these values (e.g., a storage temperature range of 20-25° C.).

In the disclosed methods for preserving avulsed teeth and/or explanted tissue, the teeth or tissue may be stored in a preservation solution for a period of time referred to as a "storage period" which may encompass any period of time. In some embodiments, the storage period is up to 0.5, 1, 2, 4, 6, 8, 12, 24, 48 hours or more, or a storage period range defined by any two of these values (e.g., a storage period range of 2-4 hours).

Preservation solutions for use in the disclosed methods for preserving avulsed teeth and/or explanted tissue may be prepared from balanced salt solutions. Suitable balanced salt solutions may include, but are not limited to Hank's Balanced Salt Solution (HBSS). In some embodiments, a preservation solution may be prepared by added sugar to HBSS at a concentration of at least about 10 g/L, 15 g/L, 20 g/L, 25 g/L, 30 g/L, 35 g/L, 40 g/L, 45 g/L, 50 g/L sugar or higher, or at a concentration range bounded by any two of these values (e.g., 20-40 g/L). A preservation solution prepared as such may be supplemented with additional components that may include, but are not limited to inorganic salts, amino acids or salts thereof, vitamins or salts thereof, and/or buffering agents as disclosed herein.

Preservation solutions for use in the disclosed methods for preserving avulsed teeth and/or explanted tissue may be prepared from basal medium for cell culture, including fibroblast basal medium. Suitable basal media may include but are not limited to Eagle's Minimal Essential Medium (EMEM) and Dulbecco's Modified Eagle Medium (DMEM). In some embodiments, a preservation solution may be prepared by added sugar to EMEM or DMEM at a concentration of at least about 10 g/L, 15 g/L, 20 g/L, 25 g/L, 30 g/L, 35 g/L, 40 g/L, 45 g/L, 50 g/L sugar or higher, or at a concentration range bounded by any two of these values (e.g., 20-40 g/L). A preservation solution prepared as such may be supplemented with additional components that may include, but are not limited to inorganic salts, amino acids or salts thereof, vitamins or salts thereof, and/or buffering agents as disclosed herein.

Preservation solutions for use in the disclosed methods for preserving avulsed teeth and/or explanted tissue may be prepared from powder formulations. As used herein, a powder formulation is a formulation having essentially no water, for example, a powder formulation prepared by freeze-drying (i.e., lyophilizing) a solution comprising the components of a preservation solution to prepare a powder formulation of the components of the preservation solution. The powder formulation preferably has a long shelf-life (e.g., a shelf-life of months or years). Shelf-life may be determined using methods known in the art, which may include but are not limited to assessing decomposition of one or more components of the powder formulation.

In some embodiments, a freeze-dried (or lyophilized) powder formulation may be prepared by freeze-drying a solution comprising the components of a preservation solution at any temperature between about −70° C. to −20° C. (we have used −70 C). Primary drying may be performed at any pressure and temperature below the triple point of pure water. The triple point of pure water is at 0.01° C. and 611.2 Pa. Therefore, theoretically, at any temperature below 0.01° C., the primary drying may be achieved if the pressure is kept below 611.2 Pa. The secondary drying may be performed at any temperature above 0.01° C. but at reduced pressures (below the atmospheric pressure).

The powder formulation may be provided in a container for preparing the preservation solution and for storing the avulsed teeth and/or explanted tissue. For example, the container may comprise the powder formulation and further water may be added to the container to prepare the preservation solution. The container may include a line indicating the amount of water that should be added to the powder formulation in the container. The container may include a removable and replaceable lid (e.g., a flip top lid or a screw-on/off cap). After water is added to the container the lid may be closed and the container may be shaken or agitated in order to dissolve the powder formulation. After the powder formulation has been dissolved, the lid of the container may be opened and the avulsed tooth or explanted tissue may be placed in the container for storage and the lid of the container may be closed.

ILLUSTRATIVE EMBODIMENTS

The following embodiments are illustrative and should not be interpreted to limit the claimed subject matter.

Embodiment 1. A method for preserving avulsed teeth and/or explanted tissue comprising live fibroblasts, the method comprising placing the tooth or tissue in a preservation solution comprising at least about 2.75 g/L sugar.

Embodiment 2. The method of embodiment 1, wherein, prior to placing the tooth or tissue in the preservation solution, the method further comprises preparing the preservation solution by adding water to a powder formulation comprising components of the preservation solution including the sugar.

Embodiment 3. The method of embodiment 1 or 2, wherein the fibroblasts comprise periodontal ligament fibroblasts.

Embodiment 4. The method of any of the foregoing embodiments, wherein the explanted tissue is dental tissue or oral tissue.

Embodiment 5. The method of embodiment 4, wherein the dental tissue is an avulsed tooth.

Embodiment 6. The method of any of the foregoing embodiments, wherein the sugar is selected from a group consisting of trehalose, glucose, sucrose, maltose, lactose, fructose, or mixtures thereof.

Embodiment 7. The method of any of the foregoing embodiments, wherein the sugar is selected from trehalose, glucose, or a mixture thereof.

Embodiment 8. The method of any of the foregoing embodiments, wherein the preservation solution comprises one or more components selected from the group consisting of inorganic salts, amino acids or salts thereof, vitamins or salts thereof, buffering agents, and/or anti-microbial agents.

Embodiment 9. The method of embodiment 8, wherein the inorganic salts are selected from the group consisting of calcium salts (e.g., calcium chloride), disodium salts (e.g., disodium hydrogen phosphate), iron salts (e.g., iron (III) nitrate nonahydrate), magnesium salts (e.g., magnesium sulfate), potassium salts (e.g., potassium chloride and potassium phosphate monobasic), sodium salts (e.g., sodium chloride, sodium dihydrogen phosphate monohydrate, and sodium bicarbonate), and mixtures thereof.

Embodiment 10. The method of embodiment 8, wherein the amino acids or salts thereof are selected from the group consisting of the following amino acids or salts thereof: L-Arginine (e.g., L-Arginine monohydrochloride), L-Cystine (e.g., L-Cystine dihydrochloride), L-Glutamine, Glycine, L-Histidine (e.g., L-Histidine monohydrochloride monohydrate), L-Isoleucine, L-Leucine, L-Lysine (e.g., L-Lysine monohydrochloride), L-Methionine, L-Phenylalanine, L-Serine, L-Threonine, L-Tryptophan, L-Tyrosine (e.g., L-Tyrosine disodium salt dihydrate), L-Valine, and mixtures thereof.

Embodiment 11. The method of embodiment 8, wherein the vitamins or salts thereof are selected from the group consisting of the following vitamins and salts thereof: pantothenic acid (e.g., D-calcium pantothenate), choline (e.g., choline chloride), folic acid, myo-inositol, niacinamide, pyridoxal (e.g., pyridoxal hydrochloride), pyridoxine (e.g., pyridoxine hydrochloride), riboflavin, thiamine (e.g., thiamine HCl), and mixtures thereof.

Embodiment 12. The method of embodiment 8, wherein the buffering agents include or comprise HEPES and/or the anti-microbial agents include or comprise anti-biotic agents and/or anti-fungal agents.

Embodiment 13. The method of any of the foregoing embodiments, wherein the preservation solution comprises fibroblast basal medium supplemented with at least 15 g/L sugar.

Embodiment 14. The method of embodiment 13, wherein the sugar is selected from trehalose, glucose, or a mixture thereof.

Embodiment 15. The method of embodiment 14, wherein the tooth or explanted tissue that has been placed in the preservation solution is stored for a storage period of at least about 0.5, 1, 2, 4, 6, 8, 12, 24, 48 hours or more.

Embodiment 16. The method of embodiment 15, wherein the fibroblasts in the explanted tissue exhibit at least about 50%, 60%, 70%, 80%, 90%, 95% viability or higher at the end of the storage period.

Embodiment 17. A method comprising: (a) preparing a preservation solution for avulsed teeth and/or explanted tissue by adding water to a powder formulation comprising components of the preservation solution; and (b) placing the tooth or tissue in the preservation solution, optionally within no more than about 60, 30, 15, 10, 5, 4, 3, 2, or 1 minutes of having prepared the preservation solution by adding water to the powder formulation.

Embodiment 18. The method of embodiment 17, wherein the preservation solution comprises at least about 2.75 g/L sugar as a component.

Embodiment 19. A preservation solution comprising fibroblast basal medium supplemented with at least 2.75 g/L sugar.

Embodiment 20. A preservation solution comprising a balanced salt solution supplemented with at least 2.75 g/L sugar.

Embodiment 21. A powder formulation for preparing a preservation solution for avulsed teeth and/or explanted tissue, wherein the powder formulation comprises, consists essentially of, or consists of a sugar and a buffering agent as components.

Embodiment 22. The powder formulation of embodiment 21, wherein the sugar is present in the powder formulation at a concentration of 50-70% (w/w) and the buffering agent is present in the powder formulation at a concentration of 30-50% (w/w).

Embodiments 23. The powder formulation of embodiment 21 or 22, wherein the sugar is trehalose.

Embodiment 24. The powder formulation of any of embodiments 21-23, wherein the buffering agent is HEPES.

Embodiment 25. The powder formulation of any of embodiments 21-24, wherein the powder formulation further comprises components selected from amino acids and salts.

Embodiment 26. A storage container for an avulsed tooth and/or explanted tissue comprising the powder formulation of any of embodiments 21-25.

Embodiment 27. The storage container of embodiment 26, wherein the storage container further comprises a removable and replaceable lid.

Embodiment 28. The storage container of embodiment 26 or 27, wherein water is added to the storage container to prepare the preservation solution and the storage container further comprises a line indicating the amount of water that should be added to the powder formulation in the container to prepare the preservation solution.

Embodiment 29. A kit comprising components for storing avulsed teeth and/or explanted tissue, the kit comprising the powder formulation of any of embodiments 21-25 and/or the storage container of any of embodiments 26-29.

EXAMPLES

The following examples are illustrative and should not be interpreted to limit the claimed subject matter.

Example 1—Storage for Dental and Oral Tissues

The current preservation methods for preserving live bio-products and tissues include classical cryopreservation (freezing) and Ice-free cryopreservation (vitrification) methods [20, 21], which have been used for decades. However, both of these methods have some limitations: 1) they require high tech, low temperature storage and transportation conditions, 2) Rewarming before using the product is a very sensitive and complex procedure that requires skilled technical support. High technology hospitals or research labs may afford employing these techniques, but they cannot be easily applied in a doctor's outpatient office.

There are several storage media commonly used currently including saliva and household items such as water or milk and commercially available items. However, each has drawbacks [22-24]. Water causes cell damage, lysis [25], and is considered the least favorable tooth storage medium [26, 27] which should be avoided [28]. Saliva, milk, and soymilk are also known as very poor storage media [29-32]. Hank's Balanced Salt Solution (HBSS) is recommended by American Association of Endodontists (AAE), American Association of Pediatric Dentists (AAPD), and the International Association for Dental Traumatology (IADT) as the standard storage medium for an avulsed tooth [28, 33, 34]. Several studies discuss its properties and have shown that HBSS can partially preserve the viability of human periodontal ligament fibroblast (HPDLF) cells for a period of time [35-48]. Cells stored in HBSS had better cell integrity than those in milk, saline, or saliva [49]. However, it does not act perfectly for preserving HPDLF cells, and its main drawback is its limited availability to the public [42]. EMT Toothsaver (SmartPractice.com, Phoenix, Ariz., USA), known as Dentosafe (Medice Arzneimittel Pütter GmbH & Co. KG, Germany) in Europe, is a commercially available product for the storage of an avulsed tooth. Case studies have exhibited a 75-100% rate of periodontal healing with teeth that were stored in EMT, yet the replantation should occur within a limited amount of hours after avulsion [50-53].

Save-A-Tooth (SAT) (Phoenix-Lazerus, Inc., Shartlesville Pa., USA) is another commercially available storage media [54-56]. Regardless of positive responses shown in an initial survey report [38], more recent studies have found rather disappointing results with SAT [54, 55, 57-59]. Several in vitro studies have shown that SAT had a similar damaging effect on HPDLF cells as dry storage after an 8-hour exposure [57], was similarly detrimental to HPDLF cells as water was after 24 hours [54, 58]; and was inferior to regular and long shelf-life milk [55], skim milk, Minimum Essential Media (MEM) [54], and HBSS [54, 58, 59] in preserving HPDLF cells.

The present inventors have prepared a new class of storage media, produced as an inspiration from an animal called tardigrade, in which solutions composed of sugars (such as trehalose and glucose) and other elements can preserve oral and dental tissues, such as avulsed teeth, more effectively than commercially available storage media especially for longer period of time. The exact formulations of effective solutions for preserving avulsed teeth are presented below. The formulation may be used for other tissues.

The use of trehalose and glucose in combination with other components as the storage solution for preservation of oral and dental tissues specially avulsed teeth is novel and readily adaptable to real world applications. Trehalose and glucose are edible, tasty sugars that can be easily stored in the kitchen, kindergarten, classroom, or any other place where children may have trauma during playtime resulting in avulsed teeth. Using trehalose and glucose may influence the cost, effectiveness and availability of the storage media.

The National Institute of Standards and Technology (NIST)[1] has identified four research areas in which substantial technical innovation is required for the development of manufacturing processes. "Product Storage" is one of these research areas (the three others include automation and scale up, sterilization and transportation of product). Investigation on new approaches for stabilizing biological products and tissues is under consideration partially based on lessons that scientists have learned from nature.

The complete dehydration of living organisms or so called "Anhydrobiosis" has fascinated scientist for a long time.[2, 3] In fact, there are many anhydrobiotic organisms that can be found in nature, including plant seeds, bacteria, insects, yeast, brine shrimp, fungi and their spores, cysts of certain crustaceans, and some soil dwelling animals.[4-9] Little was known about the mechanism of Anhydrobiosis until about four decades ago when scientists discovered that such animals synthesizes a large amount of disaccharides in their body during drying.[10]

In our approach we are inspired by the trick of tardigrades [9, 11]. Tardigrade or waterbear, is a microanimal having a length of about 0.5 mm when full grown. Tardigrade have been observed to survive extreme temperatures (as low as $-273°$ C. and as high as $151°$ C.), as well as drought, by going into a dormant state, which is called the "glassy state". Tardigrade can survive in a dehydrated state (less than 1% of normal hydration) for about ten years while its metabolism declines to less than 0.01%. The tardigrade can return to the normal state after rehydration. The secret of the tardigrade's survival during dehydration and other ambient extremes lies in the high level production of a kind of sugar called trehalose, which protects the cell membranes of the tardigrade. During the glassy state, the water around the lipid cell membrane and proteins are replaced by the sugar, which is the underlying phenomenon for the preservation of lipid molecules and proteins, and in turn, the cells and organs[12, 13].

During the last few decades, researchers investigated widely about the science of this phenomenon and provided evidences that some sugars, such as trehalose and glucose, can stabilize membranes and proteins in the dry state by hydrogen bonding to polar residues in the dry macromolecular assemblages.[11] Mimicking of this natural phenomenon is still in its early stage. Up to now, using this method, scientists were successful in preservation of some model systems including lipid liposomes, membrane, viral particles, and proteins during dry storage at ambient temperatures [11, 14, 15]. This method was also applied to a few kinds of isolated cells such as red blood cells and also matrix preservation of cardiovascular and skin tissues [15-19].

Sugars are the main source of energy for the cells. Sugars may participate in the network of hydrogen bonds between the phospholipid polar heads in the cell membrane resulting in maintaining the membrane integrity. Trehalose participates in the network of hydrogen bonds between the phospholipid polar heads, thus replaces the water of hydration at the membrane-fluid interface and maintains the headgroups at their hydrated position. It seems that trehalose is capable of forming strong hydrogen bonds with the polar group of the biomolecules. This remarkable and somewhat unique ability of trehalose to stabilize biomolecules, cells, and tissues can be attributed to its high effectiveness as a hydrogen bond donor.

Trehalose appears to be a disaccharide that can mimic a cellular chaperone, and increases autophagy in a cell via mechanisms independent of mTOR. Nutrient starvation induces a high level of autophagy. This allows unneeded proteins to be degraded and the amino acids recycled for the synthesis of proteins that are essential for survival. Cells that have a reduced autophagic capability rapidly perish in nutrition-deficient conditions. Autophagy degrades damaged organelles, cell membranes and proteins, and the failure of autophagy is thought to be one of the main reasons for the accumulation of cell damage and aging.

There appears to be an ability of trehalose to disaggregate proteins in cellular cultures, which is preserved even when autophagy is inhibited suggesting it is a different mechanism. Various protein aggregates that accumulate during neurodegenerative diseases seen to be disaggregated when trehalose is introduced, suggesting a possible preventative/therapeutic role of trehalose. Trehalose could protect the cells against apoptosis.

However, employing this strategy for preservation of oral and dental tissues has never been applied. Our finding shows that using trehalose and glucose in combination with other components can be used as an effective storage media for oral and dental tissues. For example, we used this storage media for avulsed teeth. Before presenting the results, it is important to provide the below information about the importance of storage of avulsed teeth and its relevance to human periodontal ligament fibroblast (HPDLF) cells.

Avulsed Tooth. Of all dental trauma in permanent dentition, the reported incidence rate of the tooth avulsion ranges from 0.5 to 9% [1, 2]. Traffic accidents, falls, and sporting activities have been reported to be the three most frequent incidents that lead to avulsion of incisors in children [3]. Recent independent clinical guidelines by American Association of Endodontists (AAE) [4], American Academy of Pediatric Dentistry (AAPD) [5], and International Association of Dental Traumatology (IADT) [6] recommend replanting the avulsed tooth with follow-up visits regardless of maturity of the root or extra-alveolar dry time. When treated properly and using the correct storage media for preserving the avulsed teeth, the survival rate of replanted teeth was 70% with the follow-up period of up to 20 years [7].

Replacement Resorption: The Most Prevalent Complication. The most significant and prevalent complications after the replantation of the avulsed tooth are external root resorption, predominant replacement, and resorption preceded by ankylosis [7-13].

Ankylosis and Replacement Resorption. Once the dentoalveolar ankylosis occurs, physiological bone remodeling results in root resorption by the osteoclasts followed by bone, instead of dentin, and deposition [14, 15]. Over time, the entire root will be replaced by bone, ultimately resulting in loss of the tooth [10].

Viability of HPDLF Cells: Most Critical Prognostic Factor. One of the most critical prognostic factors for the avulsed teeth is the viability of HPDLF cells at the time of replantation [7, 12, 13, 16-19]. Clinical investigations show that all the significant factors for healing of the replanted teeth had a common denominator: viability of the HPDLF cells [7, 16].

Extra-alveolar Dry Time Affects Viability of HPDLF Cells. In turn, the viability of HPDLF cells depends on extra-alveolar dry time [17, 18, 20]. A positive correlation between extra-alveolar dry time, the incidence of ankyloses, and replacement resorption has been demonstrated by a number of in vitro, clinical, and animal studies [4, 7, 12, 13, 18, 19, 21-23]. After 60 minutes of dry storage, very few HPDLF cells remained vital [18], and there were no viable HPDLF cells left after 120 minutes, as demonstrated in animal studies [16, 18] and in vitro studies using cultured HPDLF cells [17].

Therefore, Storage Media is a Key Factor. Immediate replantation provides the most favorable condition for survival of the avulsed tooth [7, 10, 21, 22]. However, it is not always possible due to fear or lack of specific knowledge [2, 24-29]. When unable to be replanted immediately, the avulsed tooth needs to be stored in a suitable storage medium until a dentist can replant it in order to prevent damage of HPDLF cells due to dryness [3, 7, 13, 21, 22, 30]. It has been suggested that a tooth storage medium should maintain viability of HPDLF cells and have physiological osmolality and pH [31].

Formulation of Storage Media and Preservation Effect on Avulsed Teeth

The present inventors formulated a storage media that is capable of preserving Periodontal Ligament Fibroblasts (PDLF) (which is a model for protecting avulsed teeth) for at least 48 hours at room temperature (hereinafter "Tooth-Preserver" solutions). The formulation maintains the viability of more than 60% of the cells after 48 hours while other commercial products such as Save-A-Tooth (SAT) and EMT tooth-saver (EMT) can save less than 40% of the cells in this period. Considering short term preservation (less than 12 hours), the inventors' formulation is again more efficient than commercially available products and approximately two times more efficient than SAT and EMT in the first 10 hours of preservation. The inventors' formulations of tooth-preservers are sugar-based solutions that contains the following 5 categories of ingredients (the dominant component is the sugar but other components also have to be included):

1. Sugars
2. Inorganic salts
3. Amino acids
4. Vitamins
5. Buffering agent

Table 1 shows the chemicals under each category used for preparation of our proposed Tooth-Preserver solutions.

TABLE 1 ingredients of the formulation

| Category | Chemicals |
|---|---|
| Sugars | D-Glucose |
|  | D-Trehalose |
| Inorganic salts | Calcium chloride |
|  | Disodium hydrogen phosphate |
|  | Iron(III) nitrate nonahydrate |
|  | Magnesium sulfate |
|  | Potassium chloride |
|  | Potassium phosphate monobasic |
|  | Sodium chloride |
|  | Sodium Dihydrogen Phosphate Monohydrate |
|  | Sodium bicarbonate |
| Amino acids | L-Arginine monohydrochloride |
|  | L-Cystine dihydrochloride |
|  | L-Glutamine |
|  | Glycine |
|  | L-Histidine monohydrochloride monohydrate |
|  | L-Isoleucine |
|  | L-Leucine |
|  | L-Lysine monohydrochloride |
|  | L-Methionine |
|  | L-Phenylalanine |
|  | L-Serine |
|  | L-Threonine |
|  | L-Tryptophan |
|  | L-Tyrosine disodium salt dihydrate |
|  | L-Valine |
| Vitamins | D-Calcium Pantothenate |
|  | Choline Chloride |
|  | Folic Acid |
|  | Myo-Inositol |
|  | Niacinamide |
|  | Pyridoxal hydrochloride |
|  | Pyridoxine hydrochloride |
|  | Riboflavin |
|  | Thiamine HCl |
| Buffering agent | HEPES |

Table 2 represents three examples of Tooth-Preserver solutions with detailed concentration of each ingredient.

TABLE 2 detailed examples of the Tooth-Preserver solutions

| Mg/L | Tooth-Preserver 1 | Tooth-Preserver 2 | Tooth-Preserver 3 |
|---|---|---|---|
| Calcium chloride | 66.7 | 133.3 | 133.3 |
| Disodium hydrogen phosphate | 16 | — | — |
| Iron(III) nitrate nonahydrate | 0.03 | 0.07 | 0.07 |
| Magnesium sulfate | 32.6 | 65.1 | 65.1 |
| Potassium chloride | 266.6 | 266.6 | 266.6 |
| Potassium phosphate monobasic | 20 | — | — |
| Sodium chloride | 4800 | 3135 | 3135 |
| Sodium Dihydrogen Phosphate Monohydrate | 41.7 | 41.7 | 41.7 |
| Sodium bicarbonate | 1350 | 2467 | 2467 |
| D-Glucose | 10833 | 3000 | 21016 |
| D-Trehalose | 17115 | 34230 | — |
| L-Arginine monohydrochloride | 28 | 56 | 56 |
| L-Cystine dihydrochloride | 20.9 | 41.7 | 41.7 |
| L-Glutamine | 194.7 | 389.3 | 389.3 |
| Glycine | 10 | 20 | 20 |
| L-Histidine monohydrochloride monohydrate | 14 | 28 | 28 |
| L-Isoleucine | 34.9 | 69.9 | 69.9 |
| L-Leucine | 34.9 | 69.9 | 69.9 |
| L-Lysine monohydrochloride | 48.7 | 97.5 | 97.5 |
| L-Methionine | 10 | 20 | 20 |
| L-Phenylalanine | 22 | 44 | 44 |
| L-Serine | 14 | 28 | 28 |
| L-Threonine | 31.7 | 63.5 | 63.5 |
| L-Tryptophan | 5.3 | 10.6 | 10.6 |
| L-Tyrosine disodium salt dihydrate | 34.6 | 69.2 | 69.2 |
| L-Valine | 31.2 | 62.4 | 62.4 |
| D-Calcium Pantothenate | 1.3 | 2.7 | 2.7 |
| Choline Chloride | 1.3 | 2.7 | 2.7 |
| Folic Acid | 1.3 | 2.7 | 2.7 |
| Myo-Inositol | 2.3 | 4.7 | 4.7 |
| Niacinamide | 1.3 | 2.7 | 2.7 |
| Pyridoxal hydrochloride | 1.3 | — | — |
| Pyridoxine hydrochloride | — | 2.7 | 2.7 |
| Riboflavin | 0.13 | 0.27 | 0.27 |
| Thiamine Hydrochloride | 1.3 | 2.7 | 2.7 |
| HEPES | — | 3972 | 3972 |

The formulation can be either HEPES-free (Tooth-Preserver 1) or HEPES-buffered (Tooth-Preserver 2 and 3). If the formulation is going to be used for specific oral tissues (other than tooth), a HEPES-free formulation may be preferred as HEPES may be detrimental to viability of some tissues.

Figure 1:
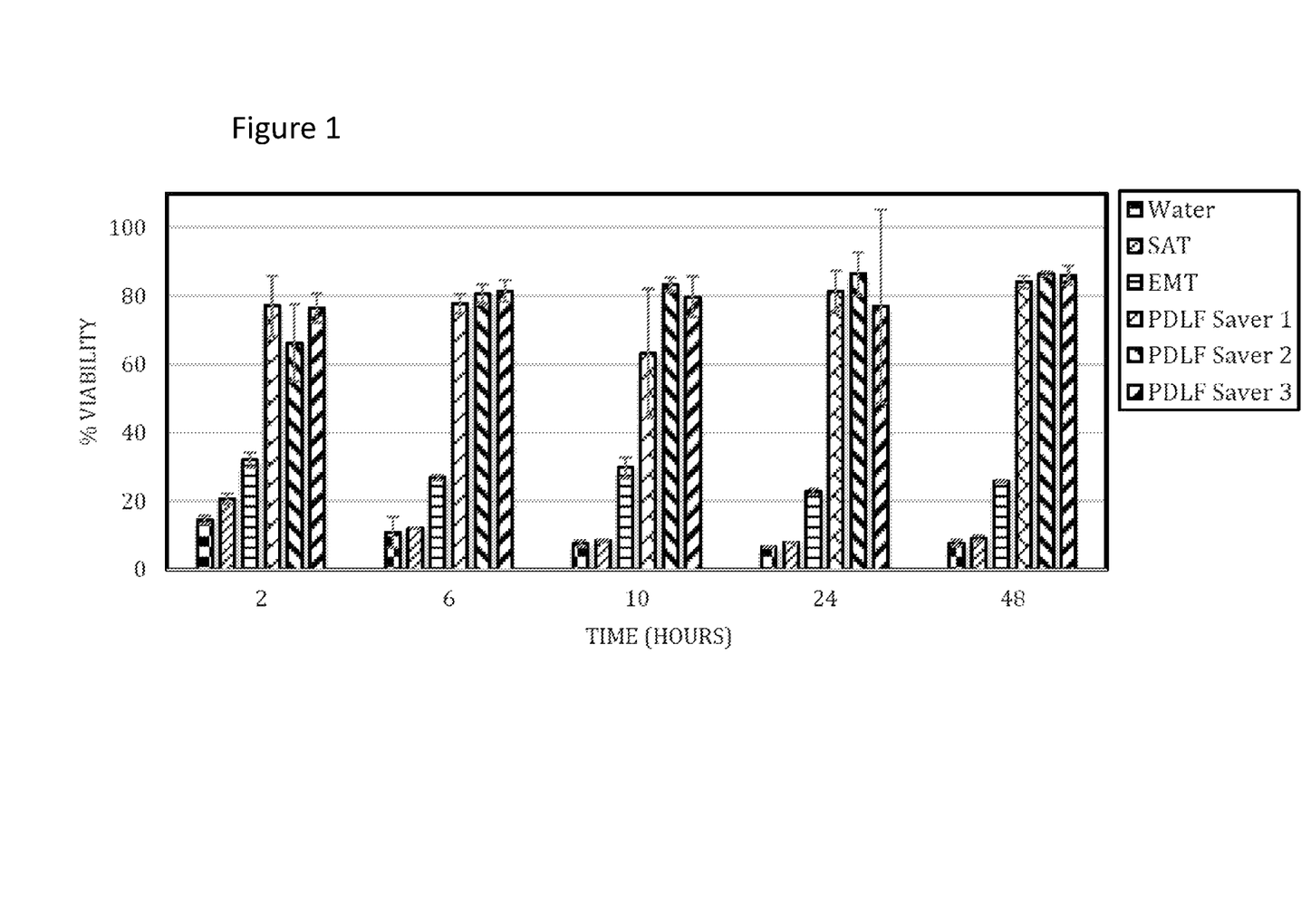
FIG. 1. Viability of periodontal ligament fibroblasts (PDLFs) in different Tooth-Preserver solutions measured at different time intervals using a tetrazolium MTT ((3-(4,5-Dimethylthiazol-2-yl)-2,5-Diphenyltetrazolium Bromide)) assay.

In order to quantify the preservation capability of the suggested formulation and compare it to the commercially available products, SAT and EMT, a viability measurement experiment was conducted. Prior to starting the experiment, PDLFs were cultured in appropriate well-plates. At the start point of the experiment, the media of the wells was replaced with water, SAT, EMT or the inventors' formulation (e.g. Tooth-Preserver 1, 2, 3 in Table 2). At certain time intervals (2, 6, 10, 24 and 48 hours), the tetrazolium dye MTT ((3-(4,5-Dimethylthiazol-2-yl)-2,5-Diphenyltetrazolium Bromide)) was added to each well and plates were incubated at 37° C. for 3 hours. Then, the media+residual dye was removed and the insoluble formazan produced by the cells was dissolved in dimethyl sulfoxide (DMSO). Finally, the viability of the cells was measured through reading the absorbance at 570 nm using a micro-plate reader. As can be seen in FIG. 1, the inventors' formulations preserve PDLFs significantly better than the tested commercial products.

The formulation of the storage media can be presented in the form of a powder. In this case the final storage media, when required (e.g., at the time the consumer is going to use the preservation solution) will be prepared by addition of certain amount of pure water.

A powder formulation referred to as "Tooth-Preserver 4" was prepared according to the following Table 3:

TABLE 3

Tooth-Preserver 4 formulation.

| Component | Concentration (mg/L) |
|---|---|
| HEPES | 5957 |
| Trehalose | 9413 |
| L-Glutamine | 1.46 |
| Sodium pyruvate | 1.1 |

A powder formulation can be prepared either by mixing the components of the powder formulation in powder form or by freeze-drying (i.e., lyophilization) of a solution comprising the components of the powder formulation. For lyophilization, a solution comprising the components of the powder formulation is transferred to −70° C. and kept at this temperature for at least 12 h to freeze the solution The frozen solution is then transferred to a freeze-dryer. Primary drying is carried out at −52° C. and 1 Pa for at least 24 h (and depending on the volume of the sample, the required time might be more (e.g., 48 h or even 72 h)). Secondary drying is carried out at room temperature and 1 Pa for at least 24 h (and depending on the volume of the sample, the required time might be more (e.g., 48 h or even 72 h)) to prepare the final lyophilized powder. The lyophilized powder then can be stored for an extended period prior to use (e.g., for months or years). When storage media is needed, an amount of pure water is added to the powder formulation to reconstitute the solution. The powder is dissolved easily and becomes ready to be used.

Figure 2:
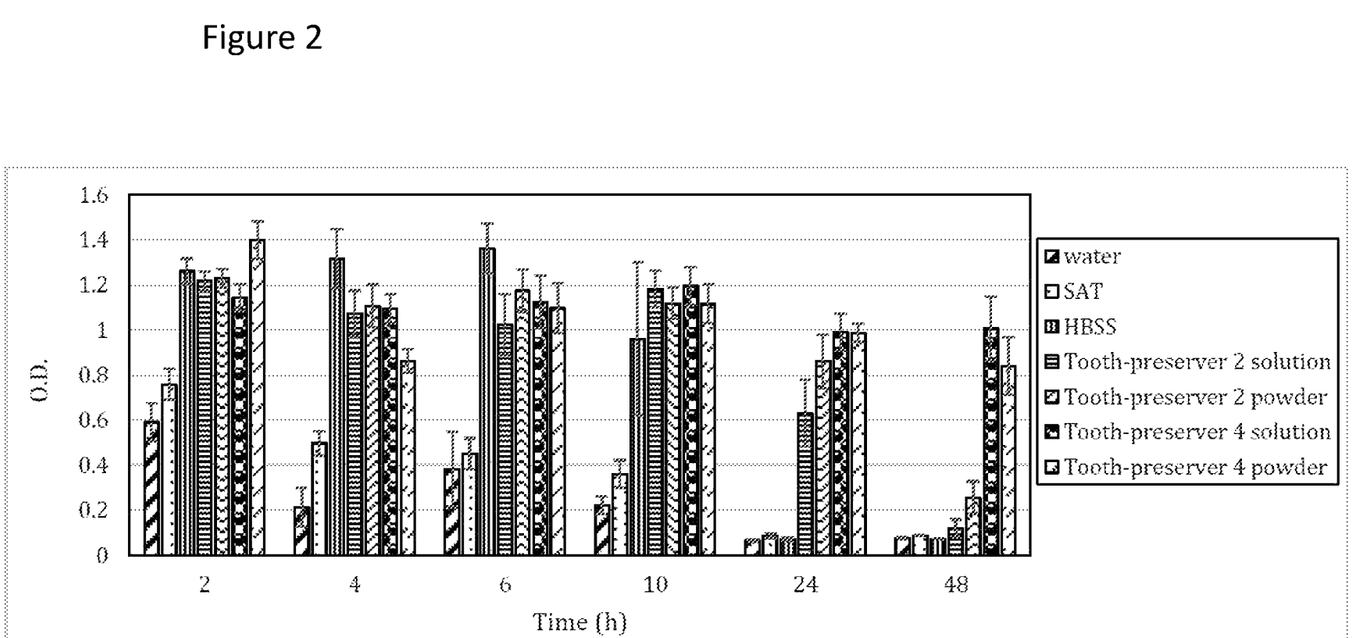
FIG. 2. Viability of periodontal ligament fibroblasts (PDLFs) in different Tooth-Preserver solutions measure at different time intervals using a tetrazolium MTT ((3-(4,5-Dimethylthiazol-2-yl)-2,5-Diphenyltetrazolium Bromide)) assay.

The Tooth-Preserver 2 formulation and Tooth-Preserver 4 formulation were prepared, lyophilized to powder forms, and reconstituted from the powder forms. In order to quantify the preservation capability of the reconstituted solution in comparison to the freshly prepared solutions, a viability measurement experiment was conducted as described above. The results are presented in FIG. 2. No significant difference was observed in the preservation capability of the reconstituted solution in comparison to the freshly prepared solution of Tooth-Preserver 2 formulation and Tooth-Preserver 4 formulation. This result indicates that the formulations may be provided in a powder form having a long shelf life (e.g., months or years).

Figure 3:
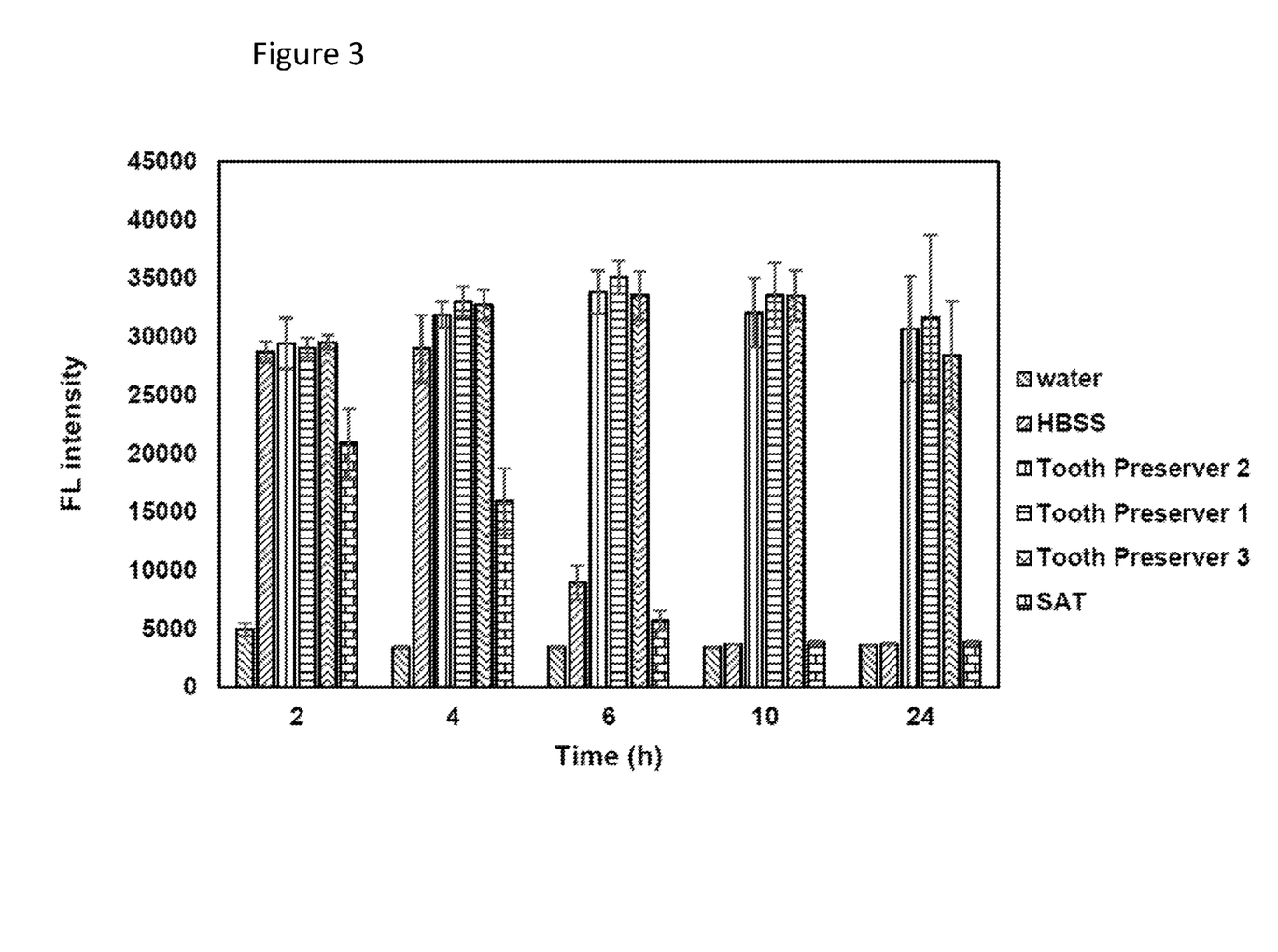
FIG. 3. Viability of periodontal ligament fibroblasts (PDLFs) in different Tooth-Preserver solutions measured at different time intervals using a PrestoBlue™ assay.

To further investigate the efficiency of the designed formulations, in addition to MTT, two additional cell viability/activity assays were employed: Prestoblue assay and ATP assay. The procedure to measure cell viability/function using these two assays and the obtained results were as follow PrestoBlue™ assay. The viability of HPDLFs were determined through PrestoBlue assay after over the specified time period exposure to storage media. At the end of each time point, storage media was removed and the attached cells were washed using PBS. Then, 100 μl of PrestoBlue 10% (v/v) in DMEM (without phenol red, Hyclone) was added to each well in 96-well plates followed by incubation at 37° C. and 5% CO2 for 1.5 h. The fluorescence absorbance for each sample was recorded using a microplate SynergyHTX Multi-Mode Reader (BioTek Instruments, Inc., Winooski, Vt., USA) at emission/excitation 540/590 nm. FIG. 3 provides a graph which displays the outcome of the assay and shows the superiority of the prepared tooth preserver formulations compared to HBSS and commercially available SAT.

Figure 4:
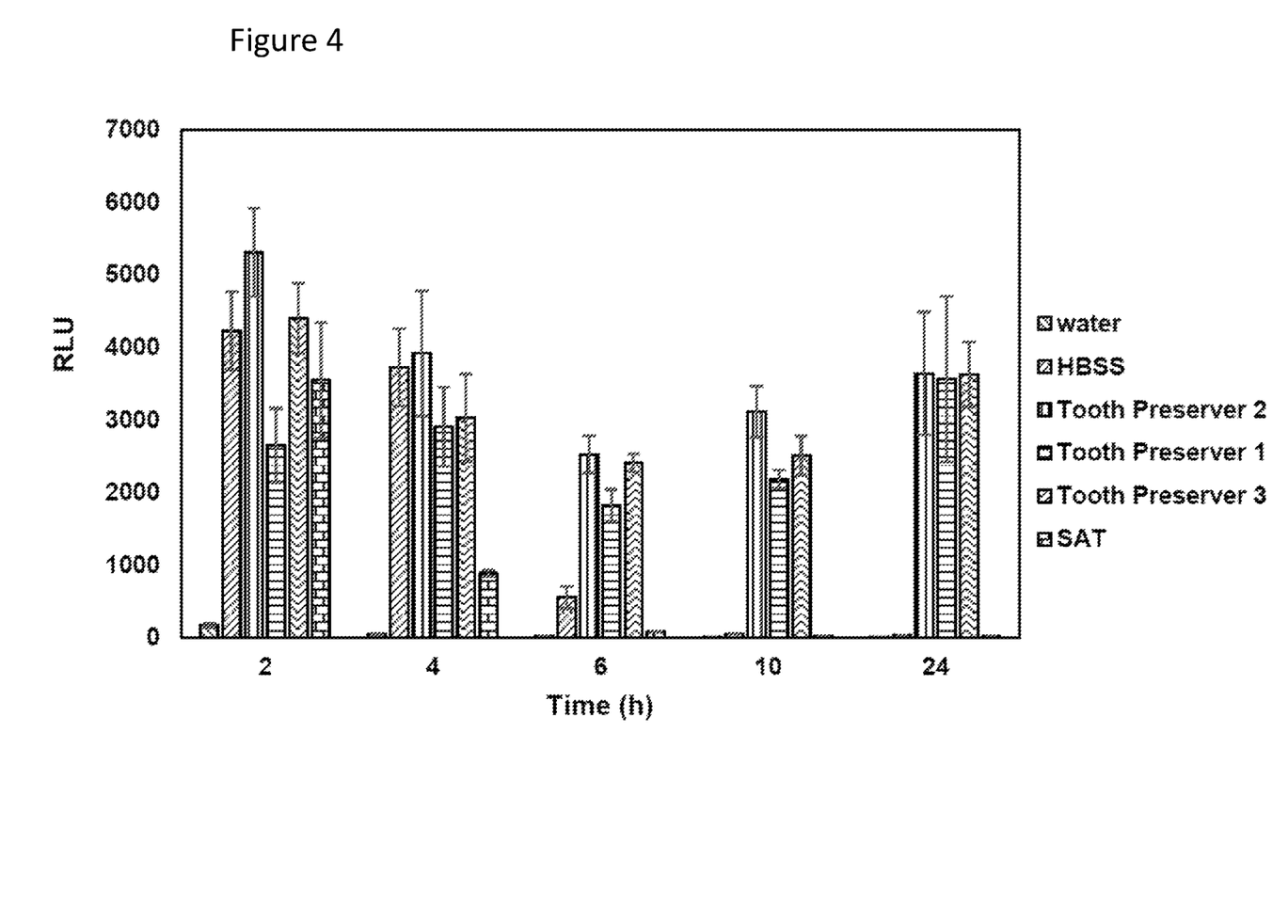
FIG. 4. Viability of periodontal ligament fibroblasts (PDLFs) in different Tooth-Preserver solutions measured at different time intervals using an ATP assay.

ATP assay. For ATP assay CellTiter-Glo Luminescent cell viability kit (Promega) was used. After recording fluorescence absorbance in the previous test, PrestoBlue and DMEM were removed at room temperature and the cells were then washed with PBS and 100 μl of CellTiter-Glo 2 in 100 μl DPBS was added to each well. The plates were shaken for 15 min at room temperature and luminescence signal for each sample was recorded in the form of Relative Light Unit (RLU) using a using SynergyHTX Multi-Mode Reader (BioTek Instruments, Inc., Winooski, Vt., USA). FIG. 4 provides a graph illustrating the results. Again, this assay showed the superiority of the prepared tooth preserver formulations.

REFERENCES

[1] Standard D E. National Institute of Standards and Technology. Federal Information Processing Standard (FIPS) Publication 2002:46-1.

[2] Crowe J H, Hoekstra F A, Crowe L M. Anhydrobiosis. Annual Review of Physiology 1992; 54:579-99.

[3] Watanabe M. Anhydrobiosis in invertebrates. Applied Entomology and Zoology 2006; 41:15-31.

[4] Browne J, Tunnacliffe A, Burnell A. Anhydrobiosis: plant desiccation gene found in a nematode. Nature 2002; 416:38-.

[5] Singh S, Ambastha V, Levine A, Sopory S K, Yadava P K, Tripathy B C, et al. Anhydrobiosis and programmed cell death in plants: Commonalities and Differences. Current Plant Biology 2015.

[6] Garcia A H. Anhydrobiosis in bacteria: from physiology to applications. Journal of biosciences 2011; 36:939-50.

[7] Gusev 0, Okuda T. "Life Without Water": The Sleeping Chironomid and Other Anhydrobiotic Invertebrates and Their Utilization in Astrobiology. Life on Earth and Other Planetary Bodies: Springer; 2012. p. 121-38.

[8] Morano K A. Anhydrobiosis: Drying Out with Sugar. Current Biology 2014; 24:R1 121-R3.

[9] Zakharova K, Tesei D, Marzban G, Dijksterhuis J, Wyatt T, Sterflinger K. Microcolonial fungi on rocks: a life in constant drought? Mycopathologia 2013; 175:537-47.

[10] Crowe J H. Anhydrobiosis: an unsolved problem. Plant, cell & environment 2014; 37:1491-3.

(11] Welnicz W, Grohme M A, Kaczmarek L, Schill R O, Frohnle M. Anhydrobiosis in tardigrades—the last decade. Journal of insect physiology 2011; 57:577-83.

[12] Cesari M, Altiero T, Rebecchi L. Identification of the trehalose-6-phosphate synthase (tps) gene in desiccation tolerant and intolerant tardigrades. Italian Journal of Zoology 2012; 79:530-40.

[13] Moiset G, Lopez C A, Bartelds R, Syga L, Rijpkema E, Cukkemane A, et al. Disaccharides Impact the Lateral Organization of Lipid Membranes. Journal of the American Chemical Society 2014; 136:16167-75.

[14] Crowe L M, Reid D S, Crowe J H. Is trehalose special for preserving dry biomaterials? Biophysical journal 1996; 71 :2087.

[15] Alves P, Hugo A, Szymanowski F, Tymczyszyn E, Perez P, Coelho J, et al. Stabilization of polymer lipid complexes prepared with lipids of lactic acid bacteria upon preservation and internalization into eukaryotic cells. Colloids and Surfaces B: Biointerfaces 2014; 123 :446-51.

[16] Arav A. 24. Freeze drying red blood cells: Development of novel technologies. Cryobiology 2013; 66:349.

[17] Parikh B, Brody M D, Stone J, Haldennan J D. Method and device for identification of nucleated red blood cells from a maternal blood sample. Google Patents; 2014.

[18] Sun W, Connor J, Qiu Q-Q, Owens R, Hayzlett M. Acellular tissue matrix preservation solution. Google Patents; 2014.

[19] Kang X L, Shen H. Pigmentation of skin graft is improved by cryopreservation of hwnan skin with trehalose. Journal of Oral and Maxillofacial Surgery 2012; 70: 1464-72.

[20] Kuleshova L L, Lopata A. Vitrification can be more favorable than slow cooling. Fertility and sterility 2002; 78:449-54.

[21] Karlsson J. Cryopreservation: freezing and vitrification. Science (New York, N.Y.) 2002; 296:655.

[22] Andersson L, Andreasen J O, Day P, Heithersay G, Trope M, DiAngelis A J, et al. International Association of Dental Traumatology guidelines for the management of traumatic dental injuries: 2. Avulsion of permanent teeth. Dental Traumatology 2012; 28:88-96.

[23] Poi W R, Sonoda C K, Martins C M, Melo M E, Pellizzer E P, Mendonca M R d, et al. Storage media for avulsed teeth: a literature review. Brazilian dental journal 2013; 24:437-45.

[24] Pohl Y, Tekin U, Boll M, Filippi A, Kirschner H. Investigations on a cell culture medium for storage and transportation of avulsed teeth. Australian Endodontic Journal 1999; 25:70-5.

[25] Blomlof L, Otteskog P, Hammarstrom L. Effect of storage in media with different ion strengths and osmolalities on human periodontal ligament cells. Scand J Dent Res 1981; 89:180-7.

[26] Trope M. Clinical management of the avulsed tooth: present strategies and future directions. Dent Traumatol 2002; 18:1-11.

[27] Andreasen J O. Effect of extra-alveolar period and storage media upon periodontal and pulpal healing after replantation of mature permanent incisors in monkeys. International journal of oral surgery 1981; 10:43-53.

[28] Andersson L, Andreasen J O, Day P, Heithersay G, Trope M, Diangelis A J, et al. International Association of Dental Traumatology guidelines for the management of traumatic dental injuries: 2. Avulsion of permanent teeth. Dent Traumatol 2012; 28:88-96.

[29] Courts F J, Mueller W A, Tabeling H J. Milk as an interim storage medium for avulsed teeth. Pediatr Dent 1983; 5:183-6.

[30] Silva E J, Rollemberg C B, Coutinho-Filho T S, Krebs R L, Zaia A A. Use of soymilk as a storage medium for avulsed teeth. Acta Odontologica Scandinavica 2013; 71:1101-4.

[31] Souza B, Lückemeyer D, Reyes-Carmona J, Felippe W, Simões C, Felippe M. Viability of human periodontal ligament fibroblasts in milk, Hank's balanced salt solution and coconut water as storage media. International endodontic journal 2011; 44:111-5.

[32] Moazami F, Mirhadi H, Geramizadeh B, Sahebi S. Comparison of soymilk, powdered milk, Hank's balanced salt solution and tap water on periodontal ligament cell survival. Dental Traumatology 2012; 28:132-5.

[33] Endodontists. AAo. The recommended guidelines of the American Association of Endodontists of the treatment of traumatic dental injuries. 2013.

[34] American Academy of Pediatric Dentistry CoCA. Guideline on management of acute dental trauma. Pediatr Dent 2008; 30:175-83.

[35] Waymouth C. Osmolality of mammalian blood and of media for culture of mammalian cells. In Vitro 1970; 6:109-27.

[36] Hiltz J, Trope M. Vitality of human lip fibroblasts in milk, Hanks balanced salt solution and Viaspan storage media. Endod Dent Traumatol 1991; 7:69-72.

[37] Hwang J Y, Choi S C, Park J H, Kang S W. The use of green tea extract as a storage medium for the avulsed tooth. J Endod 2011; 37:962-7.

[38] Krasner P, Person P. Preserving Avulsed Teeth for Replantation. The Journal of the American Dental Association 1992; 123:80-8.

[39] Mousavi B, Alavi S A, Mohajeri M R, Mirkheshti N, Ghassami F, Mirkheshti N. Standard oral rehydration solution as a new storage medium for avulsed teeth. Int Dent J 2010; 60:379-82.

[40] Khademi A A, Saei S, Mohajeri M R, Mirkheshti N, Ghassami F, Torabi nia N, et al. A new storage medium for an avulsed tooth. J Contemp Dent Pract 2008; 9:25-32.

[41] Ashkenazi M, Marouni M, Sarnat H. In vitro viability, mitogenicity and clonogenic capacity of periodontal ligament cells after storage in four media at room temperature. Endod Dent Traumatol 2000; 16:63-70.

[42] Sigalas E, Regan J D, Kramer P R, Witherspoon D E, Opperman L A. Survival of human periodontal ligament cells in media proposed for transport of avulsed teeth. Dent Traumatol 2004; 20:21-8.

[43] Mahal N K, Singh N, Thomas A M, Kakkar N. Effect of three different storage media on survival of periodontal ligament cells using collagenase-dispase assay. Int Endod J 2013; 46:365-70.

[44] Pileggi R, Dumsha T C, Nor J E. Assessment of post-traumatic PDL cells viability by a novel collagenase assay. Dent Traumatol 2002; 18:186-9.

[45] Caglar E, Sandalli N, Kuscu O O, Durhan M A, Pisiriciler R, Caliskan E A, et al. Viability of fibroblasts in a novel probiotic storage media. Dent Traumatol 2010; 26:383-7.

[46] Lekic P C, Kenny D J, Barrett E J. The influence of storage conditions on the clonogenic capacity of periodontal ligament cells: implications for tooth replantation. Int Endod J 1998; 31:137-40.

[47] Casaroto A R, Hidalgo M M, Sell A M, Franco S L, Cuman R K, Moreschi E, et al. Study of the effectiveness of propolis extract as a storage medium for avulsed teeth. Dent Traumatol 2010; 26:323-31.

[48] Trope M, Friedman S. Periodontal healing of replanted dog teeth stored in Viaspan, milk and Hank's balanced salt solution. Endod Dent Traumatol 1992; 8:183-8.

[49] Blomlof L. Milk and saliva as possible storage media for traumatically exarticulated teeth prior to replantation. Swed Dent J Suppl 1981; 8:1-26.

[50] Werder P, von Arx T, Chappuis V. Treatment outcome of 42 replanted permanent incisors with a median follow-up of 2.8 years. Schweiz Monatsschr Zahnmed 2011; 121:312-20.

[51] Pohl Y, Filippi A, Kirschner H. Results after replantation of avulsed permanent teeth. I. Endodontic considerations. Dent Traumatol 2005; 21:80-92.

[52] Pohl Y, Filippi A, Kirschner H. Results after replantation of avulsed permanent teeth. II. Periodontal healing and the role of physiologic storage and antiresorptive-regenerative therapy. Dent Traumatol 2005; 21:93-101.

[53] Pohl Y, Wahl G, Filippi A, Kirschner H. Results after replantation of avulsed permanent teeth. III. Tooth loss and survival analysis. Dent Traumatol 2005; 21:102-10.

[54] Souza B D, Luckemeyer D D, Felippe W T, Simoes C M, Felippe M C. Effect of temperature and storage media on human periodontal ligament fibroblast viability. Dent Traumatol 2010; 26:271-5.

[55] Marino T G, West L A, Liewehr F R, Mailhot J M, Buxton T B, Runner R R, et al. Determination of periodontal ligament cell viability in long shelf-life milk. J Endod 2000; 26:699-702.

[56] Krasner P R, Rankow H J, Ehrenreich A. Apparatus for storing and transporting traumatically avulsed teeth. Compendium 1989; 10:232-4, 7-8.

[57] Olson B D, Mailhot J M, Anderson R W, Schuster G S, Weller R N. Comparison of various transport media on human periodontal ligament cell viability. J Endod 1997; 23:676-9.

[58] de Souza B D, Bortoluzzi E A, da Silveira Teixeira C, Felippe W T, Simoes C M, Felippe M C. Effect of HBSS storage time on human periodontal ligament fibroblast viability. Dent Traumatol 2010; 26:481-3.

[59] Souza B D, Luckemeyer D D, Reyes-Carmona J F, Felippe W T, Simoes C M, Felippe M C. Viability of human periodontal ligament fibroblasts in milk, Hank's balanced salt solution and coconut water as storage media. Int Endod J 2011; 44:111-5.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. A method for preserving avulsed teeth and/or explanted tissue comprising live fibroblasts, the method comprising placing the tooth or tissue in a preservation solution, the preservation solution consisting of: (1) at least about 25 g/L sugar, wherein the sugar consists of trehalose or a combination of trehalose and glucose; (2) a buffer, wherein the buffer consists of fibroblast basal medium or HEPES; and (3) one or more of an inorganic salt, an amino acid or salt thereof; a vitamin or a salt thereof, (4) optionally, an antimicrobial agent; and (5) water.

2. The method of claim 1, wherein, prior to placing the tooth or tissue in the preservation solution, the method further comprises preparing the preservation solution by adding the water to a powder formulation consisting of components (1)-(3) and optionally (4) of claim 1.

3. The method of claim 1, wherein the fibroblasts comprise periodontal ligament fibroblasts.

4. The method of claim 1, wherein the explanted tissue is dental tissue or oral tissue.

5. The method of claim 3, wherein the dental tissue is an avulsed tooth.

6. The method of claim 1, wherein the inorganic salts are selected from the group consisting of calcium salts, disodium salts, iron salts, magnesium salts, potassium salts, sodium salts, and mixtures thereof.

7. The method of claim 1, wherein the amino acids or salts thereof are selected from the group consisting of the following amino acids or salts thereof: L-Arginine, L-Cystine, L-Glutamine, Glycine, L-Histidine, L-Isoleucine, L-Leucine, L-Lysine, L-Methionine, L-Phenylalanine, L-Serine, L-Threonine, L-Tryptophan, L-Tyrosine, L-Valine, and mixtures thereof.

8. The method of claim 1, wherein the vitamins or salts thereof are selected from the group consisting of the following vitamins and salts thereof: pantothenic acid, choline, folic acid, myo-inositol, niacinamide, pyridoxal, pyridoxine, riboflavin, thiamine, and mixtures thereof.

9. The method of claim 1, wherein the preservation solution comprises an antimicrobial agent selected from anti-biotic agents and/or anti-fungal agents.

10. The method of claim 1, wherein the tooth or explanted tissue that has been placed in the preservation solution is stored for a storage period of at least about 1 hour or more.

11. The method of claim 10, wherein the fibroblasts in the explanted tissue exhibit at least about 50% viability or higher at the end of the storage period.

12. A method for preserving avulsed teeth and/or explanted tissue comprising live fibroblasts, the method comprising placing the tooth or tissue in a preservation solution, the preservation solution consisting of: (1) at least about 25 g/L sugar, wherein the sugar consists of trehalose or a combination of trehalose and glucose; and (2) an inorganic salt, (3) an amino acid or salt thereof, (4) a vitamin or a salt thereof (5) optionally, an anti-microbial agent; and (6) water.

13. The method of claim 12, wherein, prior to placing the tooth or tissue in the preservation solution, the method further comprises preparing the preservation solution by adding the water to a powder formulation consisting of components (1)-(4) and optionally (5) of claim 12.

14. A method for preserving avulsed teeth and/or explanted tissue comprising live fibroblasts, the method comprising placing the tooth or tissue in a preservation solution, the preservation solution consisting of: (1) at least about 25 g/L sugar, wherein the sugar consists of trehalose or a combination of trehalose and glucose; (2) HEPES buffer; (3) an amino acid or salt thereof; (4) sodium pyruvate; and (5) water.

15. The method of claim 14, wherein, prior to placing the tooth or tissue in the preservation solution, the method further comprises preparing the preservation solution by adding the water to a powder formulation consisting of components (1)-(4) of claim 14.

* * * * *